(12) United States Patent
Gravel et al.

(10) Patent No.: US 6,561,038 B2
(45) Date of Patent: May 13, 2003

(54) SENSOR WITH FLUID ISOLATION BARRIER

(75) Inventors: James L. Gravel, Prior Lake, MN (US); Fred C. Sittler, Excelsior, MN (US); David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/978,311

(22) Filed: Oct. 15, 2001

(65) Prior Publication Data

US 2002/0100333 A1 Aug. 1, 2002

Related U.S. Application Data

(63) Continuation-in-part of application No. 09/477,689, filed on Jan. 6, 2000.

(51) Int. Cl.$^7$ ................................................. G01L 7/00
(52) U.S. Cl. ........................ 73/729.2; 73/706; 73/756
(58) Field of Search .................................. 73/700, 756

(56) References Cited

U.S. PATENT DOCUMENTS

| | | | |
|---|---|---|---|
| 3,079,576 A | 2/1963 | Kooiman | 338/4 |
| 3,147,085 A | 9/1964 | Gatti | 23/284 |
| 3,239,827 A | 3/1966 | Werner et al. | 340/236 |
| 3,356,963 A | 12/1967 | Buck | 331/65 |
| 3,387,226 A | 6/1968 | Haisma et al. | 331/94.5 |
| 3,405,559 A | 10/1968 | Moffatt | 73/398 |
| 3,477,036 A | 11/1969 | Haisma | 331/94.5 |
| 3,589,965 A | 6/1971 | Wallis et al. | 156/272 |
| 3,645,137 A | 2/1972 | Hazen | 73/398 |
| 3,696,985 A | 10/1972 | Herring et al. | 228/4.29 |
| 3,743,552 A | 7/1973 | Fa | 148/175 |
| 3,744,120 A | 7/1973 | Burgess et al. | 29/494 |
| 3,750,476 A | 8/1973 | Brown | 73/398 |
| 3,766,634 A | 10/1973 | Babcock et al. | 29/471.9 |
| 3,834,604 A | 9/1974 | Fendley et al. | 228/5 |
| 3,854,892 A | 12/1974 | Burgess et al. | 29/196.1 |
| 3,858,097 A | 12/1974 | Polye | 317/248 |
| 3,899,878 A | 8/1975 | Compton et al. | 60/39.28 T |
| 3,939,559 A | 2/1976 | Fendley et al. | 29/628 |
| RE28,798 E | 5/1976 | Herring et al. | 228/5.5 |
| 3,962,921 A | 6/1976 | Lips | 73/398 |
| 3,994,430 A | 11/1976 | Cusano et al. | 228/122 |

(List continued on next page.)

FOREIGN PATENT DOCUMENTS

| | | |
|---|---|---|
| CH | 632 891 G | 11/1982 |
| CS | 153132 | 5/1974 |
| DE | 1 648 764 | 6/1971 |

(List continued on next page.)

OTHER PUBLICATIONS

"Silicon–on–Sapphire Pressure Sensor", by C. Qinggui et al., *Transducers*, (1987), 4 pgs.

"Spectroscopic Study of the Surfaces of Glass Joined by Optical Contact", by V.M. Zolotarev et al., *Sov. J. Opt. Technol.*, (Jun. 1977), pp. 379–380.

"Effect of Scale and Time Factors on the Mechanical Strength of an Optical Contact", by S.S. Kachkin et al., *Sov. J. Opt. Technol.*, vol. 56, No. 2, (Feb. 1989), pp. 110–112.

(List continued on next page.)

*Primary Examiner*—William Oen
*Assistant Examiner*—Andre Allen
(74) *Attorney, Agent, or Firm*—Westman, Champlin & Kelly, P.A.

(57) ABSTRACT

A sensor capsule suitable for use in an industrial process fluid transmitter. The sensor capsule includes a block that has a sensor mounting hole. The block includes two half-blocks joined along mating surfaces passing lengthwise through the sensor mounting hole. A sensor has a sensor neck passing through the sensor mounting hole. The sensor neck is sealed to the sensor mounting hole.

20 Claims, 10 Drawing Sheets

U.S. PATENT DOCUMENTS

| | | | |
|---|---|---|---|
| 4,018,374 A | 4/1977 | Lee et al. | 228/121 |
| 4,064,549 A | 12/1977 | Cretzler | 361/283 |
| 4,078,711 A | 3/1978 | Bell et al. | 228/123 |
| 4,084,438 A | 4/1978 | Lee et al. | 73/706 |
| 4,088,799 A | 5/1978 | Kurtin | 427/38 |
| 4,127,840 A | 11/1978 | House | 338/4 |
| 4,128,006 A | 12/1978 | Grabow | 73/724 |
| 4,158,217 A | 6/1979 | Bell | 361/283 |
| 4,177,496 A | 12/1979 | Bell et al. | 361/283 |
| 4,196,632 A | 4/1980 | Sikorra | 73/718 |
| 4,202,217 A | 5/1980 | Kurtz et al. | 73/727 |
| 4,208,782 A | 6/1980 | Kurtz et al. | 29/580 |
| 4,216,404 A | 8/1980 | Kurtz et al. | 310/338 |
| 4,222,277 A | 9/1980 | Kurtz et al. | 73/721 |
| 4,236,137 A | 11/1980 | Kurtz et al. | 338/4 |
| 4,257,274 A | 3/1981 | Shimada et al. | 73/718 |
| 4,274,125 A | 6/1981 | Vogel | 361/283 |
| 4,276,533 A | 6/1981 | Tominaga et al. | 338/4 |
| 4,278,195 A | 7/1981 | Singh | 228/123 |
| 4,287,501 A | 9/1981 | Tominaga et al. | 338/42 |
| 4,301,492 A | 11/1981 | Paquin et al. | 361/283 |
| 4,359,498 A | 11/1982 | Mallon et al. | 428/156 |
| 4,366,716 A | 1/1983 | Yoshida | 73/718 |
| 4,389,895 A | 6/1983 | Rud, Jr. | 73/724 |
| 4,410,872 A | 10/1983 | Stecher et al. | 338/114 |
| 4,412,203 A | 10/1983 | Kurtz et al. | 338/4 |
| 4,416,156 A | 11/1983 | Denmark et al. | 73/727 |
| 4,419,142 A | 12/1983 | Matsukawa | 148/1.5 |
| 4,422,125 A | 12/1983 | Antonazzi et al. | 361/283 |
| 4,422,335 A | 12/1983 | Ohnesorge et al. | 73/724 |
| 4,424,713 A | 1/1984 | Kroninger, Jr. et al. | 73/718 |
| 4,426,673 A | 1/1984 | Bell et al. | 361/283 |
| 4,434,665 A | 3/1984 | Adolfsson et al. | 73/724 |
| 4,443,293 A | 4/1984 | Mallon et al. | 156/647 |
| 4,454,765 A | 6/1984 | Lodge | 73/724 |
| 4,456,901 A | 6/1984 | Kurtz et al. | 338/4 |
| 4,479,070 A | 10/1984 | Frische et al. | 310/338 |
| 4,495,820 A | 1/1985 | Shimada et al. | 73/724 |
| 4,497,473 A | 2/1985 | Robyn et al. | 266/44 |
| 4,507,973 A | 4/1985 | Barr et al. | 73/724 |
| 4,517,622 A | 5/1985 | Male | 361/283 |
| 4,525,766 A | 6/1985 | Petersen | 361/283 |
| 4,535,219 A | 8/1985 | Sliwa, Jr. | 219/121 |
| 4,539,061 A | 9/1985 | Sagiv | 156/278 |
| 4,542,436 A | 9/1985 | Carusillo | 361/283 |
| 4,547,801 A | 10/1985 | Haisma et al. | 358/111 |
| 4,558,817 A | 12/1985 | Kiendl | 236/12.12 |
| 4,572,000 A | 2/1986 | Kooiman | 73/718 |
| 4,586,109 A | 4/1986 | Peters et al. | 261/284 |
| 4,591,401 A | 5/1986 | Neidig et al. | 156/89 |
| 4,598,996 A | 7/1986 | Taniuchi | 356/43 |
| 4,609,966 A | 9/1986 | Kuisma | 361/283 |
| 4,625,559 A | 12/1986 | Carter et al. | 73/706 |
| 4,628,403 A | 12/1986 | Kuisma | 361/283 |
| 4,649,070 A | 3/1987 | Kondo et al. | 428/209 |
| 4,689,999 A | 9/1987 | Shkedi | 73/708 |
| 4,703,658 A | 11/1987 | Mrozack, Jr. et al. | 73/724 |
| 4,716,492 A | 12/1987 | Charboneau et al. | 73/718 |
| 4,753,109 A | 6/1988 | Zabler | 73/115 |
| 4,754,365 A | 6/1988 | Kazahaya | 361/283 |
| 4,764,747 A | 8/1988 | Kurtz et al. | 338/2 |
| 4,769,882 A | 9/1988 | Rosen et al. | 29/25.35 |
| 4,773,972 A | 9/1988 | Mikkor | 204/16 |
| 4,774,196 A | 9/1988 | Blanchard | 437/24 |
| 4,780,572 A | 10/1988 | Kondo et al. | 174/52 |
| 4,800,758 A | 1/1989 | Knecht et al. | 73/727 |
| 4,806,783 A | 2/1989 | Anderson | 307/118 |
| 4,810,318 A | 3/1989 | Haisma et al. | 156/153 |
| 4,849,374 A | 7/1989 | Chen et al. | 437/209 |
| 4,852,408 A | 8/1989 | Sanders | 73/718 |
| 4,857,130 A | 8/1989 | Curtis | 156/292 |
| 4,875,368 A | 10/1989 | Delatorre | 73/151 |
| 4,879,903 A | 11/1989 | Ramsey et al. | 73/431 |
| 4,883,215 A | 11/1989 | Goesele et al. | 228/116 |
| 4,901,197 A | 2/1990 | Albarda et al. | 361/283 |
| 4,908,921 A | 3/1990 | Chen et al. | 29/25.41 |
| 4,929,893 A | 5/1990 | Sato et al. | 324/158 |
| 4,954,925 A | 9/1990 | Bullis et al. | 361/283 |
| 4,971,925 A | 11/1990 | Alexander et al. | 437/62 |
| 4,972,717 A | 11/1990 | Southworth et al. | 73/724 |
| 4,980,243 A | 12/1990 | Malikowski et al. | 428/621 |
| 4,983,251 A | 1/1991 | Haisma et al. | 156/630 |
| 4,994,781 A | 2/1991 | Sahagen | 338/47 |
| 5,001,934 A | 3/1991 | Tuckey | 73/721 |
| 5,005,421 A | 4/1991 | Hegner et al. | 73/72 |
| 5,009,689 A | 4/1991 | Haisma et al. | 65/33 |
| 5,013,380 A | 5/1991 | Aoshima | 156/250 |
| 5,024,098 A | 6/1991 | Petitjean et al. | 73/729 |
| 5,028,558 A | 7/1991 | Haisma et al. | 437/62 |
| 5,044,202 A | 9/1991 | Southrth et al. | 73/724 |
| 5,050,034 A | 9/1991 | Hegner et al. | 361/283 |
| 5,050,035 A | 9/1991 | Hegner et al. | 361/283 |
| 5,068,712 A | 11/1991 | Murakami et al. | 357/72 |
| 5,084,123 A | 1/1992 | Curtis | 156/292 |
| 5,087,124 A | 2/1992 | Smith et al. | 356/358 |
| 5,088,329 A * | 2/1992 | Sagahan | 73/708 |
| 5,094,109 A | 3/1992 | Dean et al. | 73/718 |
| 5,095,741 A | 3/1992 | Bartig et al. | 73/115 |
| 5,113,868 A | 5/1992 | Wise et al. | 128/675 |
| 5,123,849 A | 6/1992 | Deak et al. | 439/66 |
| 5,133,215 A | 7/1992 | Lane, III et al. | 73/756 |
| 5,155,061 A | 10/1992 | O'Connor et al. | 437/86 |
| 5,157,972 A * | 10/1992 | Broden et al. | 73/718 |
| 5,174,926 A | 12/1992 | Sahagen | 252/521 |
| 5,178,015 A | 1/1993 | Loeppert et al. | 73/718 |
| 5,189,591 A | 2/1993 | Bernot | 361/283 |
| 5,189,916 A | 3/1993 | Mizumoto et al. | 73/724 |
| 5,197,892 A | 3/1993 | Yoshizawa et al. | 439/91 |
| 5,201,228 A | 4/1993 | Kojima et al. | 73/724 |
| 5,201,977 A | 4/1993 | Aoshima | 156/153 |
| 5,214,563 A | 5/1993 | Estes | 361/386 |
| 5,214,961 A | 6/1993 | Kojima et al. | 73/715 |
| 5,227,068 A | 7/1993 | Runyon | 210/610 |
| 5,228,862 A | 7/1993 | Baumberger et al. | 439/66 |
| 5,231,301 A | 7/1993 | Peterson et al. | 257/419 |
| 5,236,118 A | 8/1993 | Bower et al. | 228/193 |
| 5,242,863 A | 9/1993 | Xiang-Zheng et al. | 437/228 |
| 5,242,864 A | 9/1993 | Fassberg et al. | 437/228 |
| 5,257,542 A | 11/1993 | Voss | 73/724 |
| 5,261,999 A | 11/1993 | Pinker et al. | 156/630 |
| 5,271,277 A | 12/1993 | Pandorf | 73/724 |
| 5,287,746 A | 2/1994 | Broden | 73/706 |
| 5,294,760 A | 3/1994 | Bower et al. | 200/83 |
| 5,314,107 A | 5/1994 | d'Aragona et al. | 228/116 |
| 5,315,481 A | 5/1994 | Smolley | 361/707 |
| 5,319,324 A | 6/1994 | Satoh et al. | 331/158 |
| 5,326,726 A | 7/1994 | Tsang et al. | 437/228 |
| 5,332,469 A | 7/1994 | Mastrangelo | 156/643 |
| 5,349,492 A | 9/1994 | Kimura et al. | 361/283.4 |
| 5,381,300 A | 1/1995 | Thomas et al. | 361/280 |
| 5,424,650 A | 6/1995 | Frick | 324/688 |
| 5,437,189 A | 8/1995 | Brown et al. | 73/721 |
| 5,440,075 A | 8/1995 | Kawakita et al. | 174/265 |
| 5,466,630 A | 11/1995 | Lur | 437/62 |
| 5,470,797 A | 11/1995 | Mastrangelo | 437/225 |
| 5,471,884 A | 12/1995 | Czarnocki et al. | 73/720 |
| 5,478,972 A | 12/1995 | Mizutani et al. | 174/250 |
| 5,479,827 A | 1/1996 | Kimura et al. | 73/718 |
| 5,481,795 A | 1/1996 | Hatakeyama et al. | 29/852 |
| 5,483,834 A | 1/1996 | Frick | 73/724 |
| 5,528,452 A | 6/1996 | Ko | 361/283.4 |

| | | | |
|---|---|---|---|
| 5,532,187 A | 7/1996 | Schreiber-Prillwitz et al. | 437/182 |
| 5,554,809 A | 9/1996 | Tobita et al. | 73/700 |
| 5,612,497 A | 3/1997 | Walter et al. | 73/756 |
| 5,637,802 A | 6/1997 | Frick et al. | 73/724 |
| 5,731,522 A | 3/1998 | Sittler | 73/708 |
| 6,089,097 A * | 7/2000 | Frick et al. | 73/724 |
| 6,106,476 A | 8/2000 | Corl et al. | 600/486 |
| 6,126,889 A | 10/2000 | Scott et al. | 264/632 |
| 6,131,462 A | 10/2000 | EerNisse et al. | 73/702 |
| 6,311,563 B1 | 11/2001 | Ishikura | 73/724 |

FOREIGN PATENT DOCUMENTS

| | | |
|---|---|---|
| DE | 2 021 479 | 11/1971 |
| DE | 2 221 062 | 11/1972 |
| DE | 24 59 612 | 7/1975 |
| DE | 34 04 262 A1 | 9/1984 |
| DE | 40 11 901 A1 | 10/1991 |
| DE | 42 44 450 A1 | 12/1992 |
| EP | 0 024 945 A2 | 9/1980 |
| EP | 0 136 050 A1 | 8/1984 |
| EP | 0 161 740 A2 | 2/1985 |
| EP | 0 166 218 A2 | 5/1985 |
| EP | 0 182 032 A2 | 9/1985 |
| EP | 0 190 508 A2 | 12/1985 |
| EP | 0 207 272 A2 | 5/1986 |
| EP | 0 213 299 A2 | 6/1986 |
| EP | 0 210 843 A2 | 7/1986 |
| EP | 0 256 150 A1 | 8/1986 |
| EP | 0 351 701 B1 | 7/1989 |
| EP | 0 355 340 A1 | 2/1990 |
| EP | 0 383 391 A1 | 8/1990 |
| EP | 0 430 676 A2 | 11/1990 |
| EP | 0 410 679 A1 | 1/1991 |
| EP | 0 413 547 A2 | 2/1991 |
| EP | 0 444 942 A1 | 9/1991 |
| EP | 0 444 943 A | 9/1991 |
| EP | 0 451 993 A2 | 10/1991 |
| EP | 0 456 060 A1 | 11/1991 |
| EP | 0 460 763 A2 | 11/1991 |
| EP | 0 473 109 A2 | 3/1992 |
| EP | 0 476 897 A2 | 3/1992 |
| EP | 0 526 290 A1 | 2/1993 |
| EP | 0 547 684 A2 | 6/1993 |
| EP | 0 556 009 A2 | 8/1993 |
| EP | 0 579 298 A1 | 1/1994 |
| EP | 0 928 959 A2 | 7/1999 |
| FR | 1 568 487 | 5/1969 |
| FR | 2 246 506 | 5/1975 |
| FR | 2 455 733 | 11/1980 |
| GB | 1 069 435 | 11/1963 |
| GB | 1 305 885 | 4/1971 |
| GB | 2034478 | 6/1980 |
| GB | 2 071 853 A1 | 3/1981 |
| GB | 2 168 160 A | 11/1985 |
| JP | 49-38911 | 4/1974 |
| JP | 60-97676 | 5/1985 |
| JP | 62-70271 | 3/1987 |
| JP | 60-195546 | 7/1987 |
| JP | 62-104131 | 7/1987 |
| JP | 62-167426 | 7/1987 |
| JP | 62-259475 | 11/1987 |
| JP | 63-285195 | 11/1988 |
| JP | 63-292032 | 11/1988 |
| JP | 91-311556 | 4/1990 |
| JP | 2-148768 | 6/1990 |
| JP | 2-249936 | 10/1990 |
| JP | 3-239940 | 10/1991 |
| JP | 2852593 | 3/1993 |
| JP | 5-107254 | 4/1993 |
| JP | 5-231975 | 9/1993 |
| JP | 6-21741 | 1/1994 |
| JP | 6-265428 | 9/1994 |
| JP | 6-300650 | 10/1994 |
| JP | 283761 | 10/1998 |
| JP | 11006780 | 12/1999 |
| SU | 463643 | 10/1975 |
| SU | 736216 | 5/1980 |
| SU | 1398825 A1 | 5/1988 |
| SU | 1597627 A1 | 10/1990 |
| SU | 1629763 A1 | 2/1991 |
| WO | WO 83/00385 | 2/1983 |
| WO | WO 85/02677 | 6/1985 |
| WO | WO 87/07947 | 12/1987 |
| WO | WO 87/07948 | 12/1987 |
| WO | WO 89/08243 | 9/1989 |
| WO | WO 93/22644 | 11/1993 |
| WO | WO 96/16418 | 5/1996 |

OTHER PUBLICATIONS

"High Pressure Sensors", *Instrument Engineers Handbook Vol. 1, Process Measurement*, B. Liptak, Editor, pp. 244–245.

"Silicon on Sapphire: The Key Technology for High–Temperature Piezoresistive Pressure Transducers", by H.W. Keller et al., *Transducers*, (1987), 4 pgs.

"Optical–Contact Bonding Strength of Glass Components", by S.S. Kachkin et al., *Sov. J. Opt. Technol.*, vol. 47, No. 3, (Mar. 1980), pp. 159–161.

"A Cold High–Vacuum Seal Without Gaskets", by L. Macebo, *University of California Lawrence Radiation Laboratory*, (Sep. 1, 1962), pp. 1–11.

"Diffusionsschweissen Optischer Bauelemente Aus Quarzglas", by K. Veb et al., *Schweisstechnik*, Berlin, (1983), pp. 262–264.

"Pressure and Temperature Measurements with Saw Sensors", by D. Hauden et al., *36th Annual Frequency Control Symposium*, (1982), pp. 284–289.

"Transient Response of Capacitive Pressure Sensors", by P. Pons et al., *Sensors and Actuators*, (1992) pp. 616–621.

"Analysis and Design of a Four–Terminal Silicon Pressure Sensor at the Centre of a Diaphragm", by M. Bao et al, *Sensors and Actuators*, (1987), pp. 49–56.

"A Stress and Temperature Compensated Orientation and Propagation Direction for Surface Acoustic Wave Devices", by B. Sinha, *IEEE Transactions on Ultrasonics, Ferroelectrics, and Frequency Control*, vol. UFFC–34, No. 1, (Jan. 1987), pp. 64–74.

"Nonlinear Analyses on CMOS Integrated Silicon Pressure Sensors", by K. Suzuki et al., *IEEE*, (1985), pp. 137–140.

"New Techniques for Fusion Bonding and Replication for Large Glass Reflectors", by J.R. Angel, *Steward Observatory*, University of Arizona, pp. 52–56.

"Pressure Sensitivity in Anisotropically Etched Thin–Diaphragm Pressure Sensors", by S. Clark et al, *IEEE Transactions on Electron Devices*, vol. Ed–26, No. 12, (Dec. 1979), pp. 1887–1896.

"A Model for the Silicon Wafer Bonding Process", by R. Stengl et al., *Japanese Journal on Applied Physics*, (Oct. 1989), pp. 1735–1741.

"Study of the Stressed State of a Sintered Quartz Monoblock", by Y. Lisitsyn et al., *Plenum Publishing Corporation*, (1986), pp. 643–645.

"Direct Bonding in Patent Literature", by J. Haisma, *Philips J. Res.*, (1995), pp. 165–170.

"Special Issue on Direct Bonding", by J. Haisma et al., *Philips Journal of Research*, vol. 49, No. 1/2, (1995), pp. 1–182.

"Diversity and Feasibility of Direct Bonding: A Survey of a Dedicated Optical Technology", by J. Haisma et al., *Applied Optics*, vol. 33, No. 7, (Mar. 1994), pp. 1154–1169.

"Structure and Morphology of the Reaction Fronts During the Formation of $MgAl_2O_4$ Thin Films by Solid State Reaction Between R–cut Sapphire Substrates and MgO Films", by D. Hesse et al., *Interface Science*, (1994) pp. 221–237.

"Development of a High Temperature Capacitive Pressure Transducer", by R.L. Egger, *NASA CR–135282* (Oct. 1977)., pp. 1–114.

"High Temperature Pressure Transducer", *Techlink Industry*, Techlink No. 2359, (1978), 2 pgs.

"Quartz Capsule Pressure Transducer for the Automotive Industry", by D.Y. Lee et al., *SAE Technical Paper Series Society of Automotive Engineers, Inc.*, (Feb. 1981), 6 pgs.

"Low–Cost High–Sensitivity Integrated Pressure and Temperature Sensor", by P. Pons et al., *Sensors and Actuators*, (1994), pp. 398–401.

"A New Type of High Performance Device for VLSI Digital System", by X. Xiao–Li et al., *Solid State Devices*, (1988), pp. 579–582.

"Wafer Bonding For SOI", by W.P. Maszara et al., *Mat. Res. Soc. Symp. Proc.*. vol. 107, (1988), 2 pgs.

"Silicon Fusion Bonding For Pressure Sensors", by K. Petersen et al., *IEEE*, (1988), pp. 146–147.

"Silicon–To–Silicon Direct Bonding Method", by M. Shimbo et al., *Journal of Applied Physics*, vol. 60, No. 8, (Oct. 1986), pp. 2987–2989.

"A Model for the Silicon Wafer Bonding Process", by R. Stengl et al., *Japanese Journal of Applied Physics*, vol. 28, No. 10, (Oct. 1989), pp. 1735 & 1741.

"A Small and Stable Continuous Gas Laser", by H.G. Van Bueren et al., *Physics Letters* vol. 2, No. 7, (Nov. 1962), 2 pgs.

"Direct Bonding of Ceramics and Metals by Means of a Surface Activation Method in Ultrahigh Vacuum", by T. Suga et al., *Proceedings of the MRS International Meeting on Advanced Materials*, vol. 8, (Jun. 1988), pp. 257–263.

"Silicon–On–Insulator Wafer Bonding–Wafer Thinning Technological Evaluations", by J. Haisma et al., *Japanese Journal of Applied Physics*, vol. 28, No. 8, (Aug. 1989), 4 pgs.

"Closure and Repropogation of Healed Cracks in Silicate Glass", by T. Michalske et al., *Journal of the American Ceramic Society*, vol., 68, No. 11, (Nov. 1985), 3 pgs.

"Use of Strain Gauges with a Silicon–On–Sapphire Structure for Thermophysical Experiments", by V.F. Kukarin et al., *Plenum Publishing Corporation*, (1986) pp. 1085–1087.

"Metrological Characteristics for Sapfir–22D Pressure Sensors", by A.M. Evtyushenkov et al., *Plenum Publishing Corporation*, (1989), pp. 147–150.

"Low–Temperature Characteristics of the Transducer", *Rev. Sci. Instrum.*, vol. 56, No. 6, (Jun. 1985), pp. 1237–1238.

"The Joining of Ceramics", by A.S. Bahrani, *Int. J. for the Joining of Materials*, vol. 4, No. 1 (1992), pp. 13–19.

"Chemical Free Room Temperature Wafer to Wafer Direct Bonding", by S. Farrens et al., *J. Electrochem. Soc.*, vol. 142, No. 11, (Nov. 1985), pp. 3949–3955.

"Morphological Evolution of Pore Channels in Alumina", by J. Rodel et al., *Ceramic Transactions—Sintering of Advanced Ceramics*, vol. 7, (May 1988), pp. 243–257.

"Le Poli Optique, Element De La Construction Des Tubes A Vide (')", by P. Danzin et al., *Annales De Radioelectricite*, (Jan. 1948), pp. 281–289.

"Strength of Glass Ceramic S0115M and its Joints Based on Optical Contact", by A.I. Busel et al, *Plenum Publishing Corporation*, (1983), p. 378.

"Bubble–Free Silicon Wafer Bonding in a Non–Cleanroom Environment", by R. Stengl et al., *Department of Mechanical Engineering and Materials Science*, Duke University, (1988) p. L2364.

"Boundary Migration of Single Crystal in Polycrystalline Alumina", by M. Kinoshita, *Journal of the Ceramic Society of Japan*, vol. 82, No. 945, (1974), pp. 295–296.

"Diffusion Bonding of Ceramics", by C. Scott et al., *American Ceramic Society Bulletin*, (Aug. 1985) pp. 1129–1131.

"Creep of Sensor's Elastic Elements: Metals versus Non–metals", K. Bethe, D. Baumgarten and J. Frank, *Nova Sensor—Silicon Sensors and Microstructure*, 1990, pp. 844–849.

"High–Temperature Healing of Lithographically Introduced Cracks in Sapphire", J. Rödel and A.M. Glaeser, *J. Am. Ceram. Soc.*, vol. 73, No. 3, Mar. 1990, pp. 592–601.

"Fabrication of an Implantable Capacitive Type Pressure Sensor", S. Shoji, T. Nisase, M. Esashi and T. Matsuo, *Transducers '87*, 1987.

"Small sensitive pressure transducer for use at low temperatures", W. Griffioen and G. Frossati, *Rev. Sci. Instrum.*, vol. 56, No. 6, Jun. 1985, pp. 1236–1238.

"Interface charge control of directly bonded silicon structures", S. Bengtsson and O. Engström, *J. Appl. Phys.*, vol. 66, No. 3, Aug. 1, 1989, pp. 1231–1239.

"Wafer bonding for silicon–on–insulator technologies", J.B. Lasky, *Appl. Phys Lett.*, vol. 48, No. 1, Jan. 1, 1986, pp. 78–80.

"Production of Controlled–Morphology Pore Arrays: Implications and Opportunities", J. Rödel and A.M. Glaeser, *J. Am. Ceram. Soc.*, vol. 70, No. 8, Aug. 1987, pp. C–172—C–175.

"Low–Temperature Preparation of Silicon/Silicon Interface by the Silicon–to–Silicon Direct Bonding Method", by S. Bengtsson et al., *J. Electrochem. Soc.*, vol. 137, No. 7, (Jul. 1990), pp. 2297–2303.

"Phase Formation Study in $\alpha-Al_2O_3$ Implanted With Niobium Ions", by L. Romana, P. Thevenard, B. Canut, G. Massouras and R. Brenier, *Nuclear Instruments and Methods in Physics Research B46*, published by Elsevier Science Publishers B.V. (North–Holland), pp. 94–97 (1990).

"Surface electrical properties of Ni–implanted sapphire", by L. Shipu, F. Donghui, X. Ning, S. Zhenya and C. Xiaoming, *Processing of Advanced Materials*, published by Chapman & Hall, pp. 77–80 (1991).

"Silicon Microcavities Fabricated with a New Technique", L. Tenerz and B. Hök, *Electronics Letters*, vol. 22, No. 11, May 22, 1986, pp. 615–616.

"A Balanced Resonant Pressure Sensor", E. Stemme and G. Stemme, *Sensors and Actuators*, A21–A23, 1990, pp. 336–341.

"Silicon Sensors and Microstructure", J. Brysek, K. Petersen, J. Mallon, Jr., L. Christel, F. Pourahmadi, *Nova Sensor*, Jun. 1990, pp. 5.4–5.8, 8.21–8.23, 9.9–9.10, 9.13–9.15.

"Why Nanoparticles Are So Big", C. Crabb, C. Armesto, T. Kamiya, *Chemical Engineering*, Apr. 1999, pp. 37–41.

"Patterning Plastic With Plentiful Pillars", *Science*, vol. 286, pp. 1067, 5 Nov. 1999.

*Physical Metallurgy Principles*, pp. 251–269, Oct. 26, 1993.

"Grain Growth, Sintering, and Vitrification", *Introduction to Ceramics*, pp. 448–461, Jan. 9, 1990.

\* cited by examiner

SENSOR WITH FLUID ISOLATION BARRIER

CROSS REFERENCE TO RELATED APPLICATION

This application is a Continuation-in-Part application and claims priority benefits from U.S. application Ser. No. 09/477,689 titled "Pressure Sensor Capsule with Improved Isolation" filed Jan. 6, 2000.

FIELD OF THE INVENTION

The present invention relates to sensors for use in sensing properties of industrial fluids for process control. In particular, the present invention relates to sensors that include isolation between the industrial fluids and the sensor's leads.

BACKGROUND OF THE INVENTION

Industrial transmitters are used to sense fluid parameters such as pressure, temperature, flow, and pH, and transmit the value of the sensed fluid parameter to a remote location such as a control system. These transmitters include sensors that are mounted in or near the transmitter. The sensor has a sensing surface that contacts an industrial fluid, and also electrical sensor leads. Various types of isolation are used to ensure accurate, reliable operation of each sensor. The electrical sensor leads are fluid-isolated from contact with the industrial fluid to avoid corroding the leads. The sensing surface is mechanically isolated from mounting stress to reduce errors in the sensor's electrical output due to mechanical stress, particularly at temperature extremes. The sensor's electrical circuitry is galvanically isolated from the industrial fluid to avoid errors from stray ground current. These three types of isolation need to be robust and effective over a wide operating temperature range for use in an industrial transmitter.

It is difficult to mount a sensor in a transmitter in a way that provides corrosion resistance for the sensor leads, adequate mechanical stress isolation, and also galvanic isolation. The problem is aggravated by wide operating temperature ranges for industrial transmitters. As temperature increases, expensive glass-to-metal seals tend to leak, mounting components expand at different rates leading to mechanical stress, and galvanic leakage increases with temperature.

In particular, when a sensor is extremely miniaturized and has rectangular cross sectional dimensions on the order of 5 mm (0.2 inch), it is difficult to precisely machine a correspondingly rectangular opening in a sensor mounting block which fits to the miniature sensor cross section with a small gap that can be reliably sealed.

A sensor capsule is needed that provides stress isolation, fluid isolation and electrical isolation in a package that is sized for a miniature sensor and suitable for use in an industrial transmitter.

SUMMARY OF THE INVENTION

A sensor capsule suitable for use in an industrial process fluid transmitter is disclosed.

The sensor capsule comprises a block that has a sensor mounting hole with a sensor mounting hole length extending from a first outer block surface into a pressure chamber in the block. The block further includes a fluid inlet hole extending from a second outer block surface into the pressure chamber. The block comprises two half-blocks joined along joining or mating surfaces passing lengthwise through the sensor mounting hole.

The sensor capsule also includes a sensor that has a sensor neck passing through the sensor mounting hole. The sensor has a fluid sensing surface suspended in the pressure chamber and electrical sensor connections outside the pressure chamber. The sensor neck is separated from the sensor mounting hole by a gap that extends in a continuous path around the sensor neck. A sealing joint fills the gap to join the sensor neck to the sensor mounting hole.

These and various other features as well as advantages which characterize the present invention will be apparent upon reading of the following detailed description and review of the associated drawings.

DETAILED DESCRIPTION

In the embodiments illustrated below, a miniature ceramic sensor has a sensor neck that passes through a sensor mounting hole. A gap between the sensor neck and the sensor mounting hole is filled with a sealing material that can be a braze joint or a sealing compound. The miniature ceramic sensor has a generally rectangular cross-section with small dimensions on the order of 5 mm (0.2 inch).

It is difficult to accurately machine a hole in the block that is not round and that has sharp corners when there are such small dimensions and close spacing tolerances. To overcome this problem, the block is made up of two half blocks, which may or may not be identical to one another. The two half blocks have joining or mating surfaces that are joined together with one another after forming to make a completed block. Before joining, each mating surface provides an open face that can be conveniently injection molded or machined using a numerically controlled milling machine to provide a generally rectangular half cavity which is shaped to receive the sensor neck. When machined, ordinary commercially available cutting bits can be used in the milling machine and there is no need to design custom bits or use exotic cutting processes. When molded, simple dies can be used. The interior pressure cavity, which would be extremely difficult to machine or mold inside a solid block, is easily machined using conventional tool bits cutting into the open faces at the joining surface of the half blocks. Alternatively, it can be conveniently molded. For convenience in assembling the half blocks, alignment holes and pins, or molded alignment dimples can be provided. If desired, details such as fingers to aid in alignment during sensor sealing can also be conveniently formed into the sensor mounting hole. The optional fingers help make gaps formed more uniform and provide higher production yields on the sensor braze joint. A direct brazed seal between a sensor mounting hole in a block and a ceramic sensor body is achieved. The fingers tend to hold the sensor in an approximately centered location, allowing sealing material to flow entirely around the circumference of the sensor neck. Once sealing material has flowed completely around the sensor neck, capillary action tends to further center the sensor neck in the sensor mounting hole, assuring a uniform thickness of sealing material around the circumference. A uniformly thick sensor braze joint or joint of sealing compound provides a high quality seal for fluid isolation.

The sensor has a sensing surface that is spaced away from the sensor seal joint and suspended in a pressure chamber in the block, assuring good mechanical stress isolation. The body of the sensor is preferably a non-conducting ceramic material, ensuring good galvanic isolation between the block and electrical sensor circuits. The use of expensive glass-to-metal seals is avoided, and the finished sensor capsule has a wide operating temperature range.

If desired, a "well" can be included in an outer block surface surrounding the sensor mounting hole. The well can be filled with a precisely measured quantity of particles of braze material. The seal is solidified with a pin holding the sensor in place, and braze material melts and flows into the gap without excessive quantities of braze material spilling into the pressure cavity. The pin is then removed before the sensor capsule is put in service.

When sealing compound is used, the well serves as an aid to visual inspection of the filling level of the sealing compound.

Figure 1:
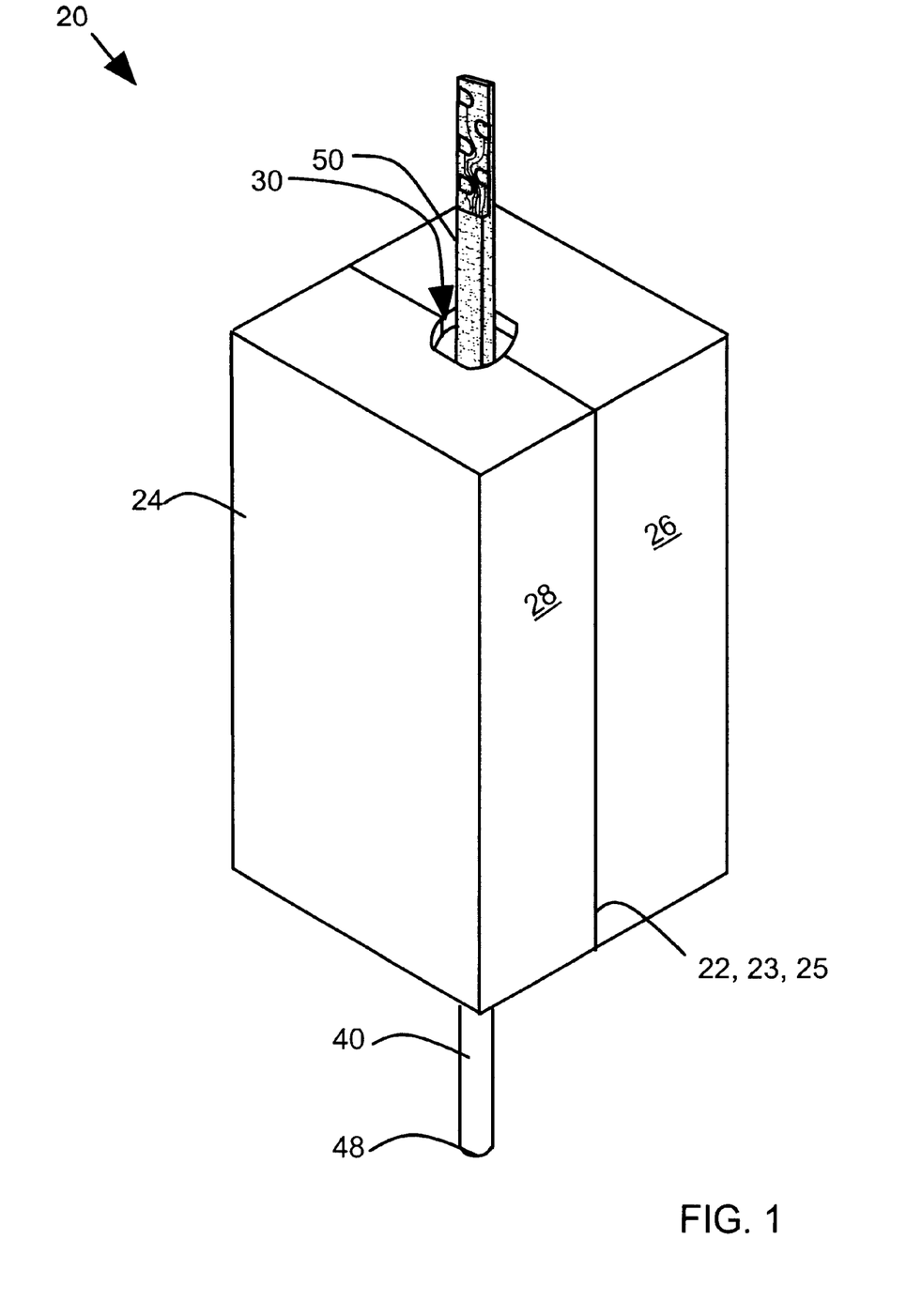
FIG. 1 illustrates an isometric view of a sensor capsule.
Figure 2:
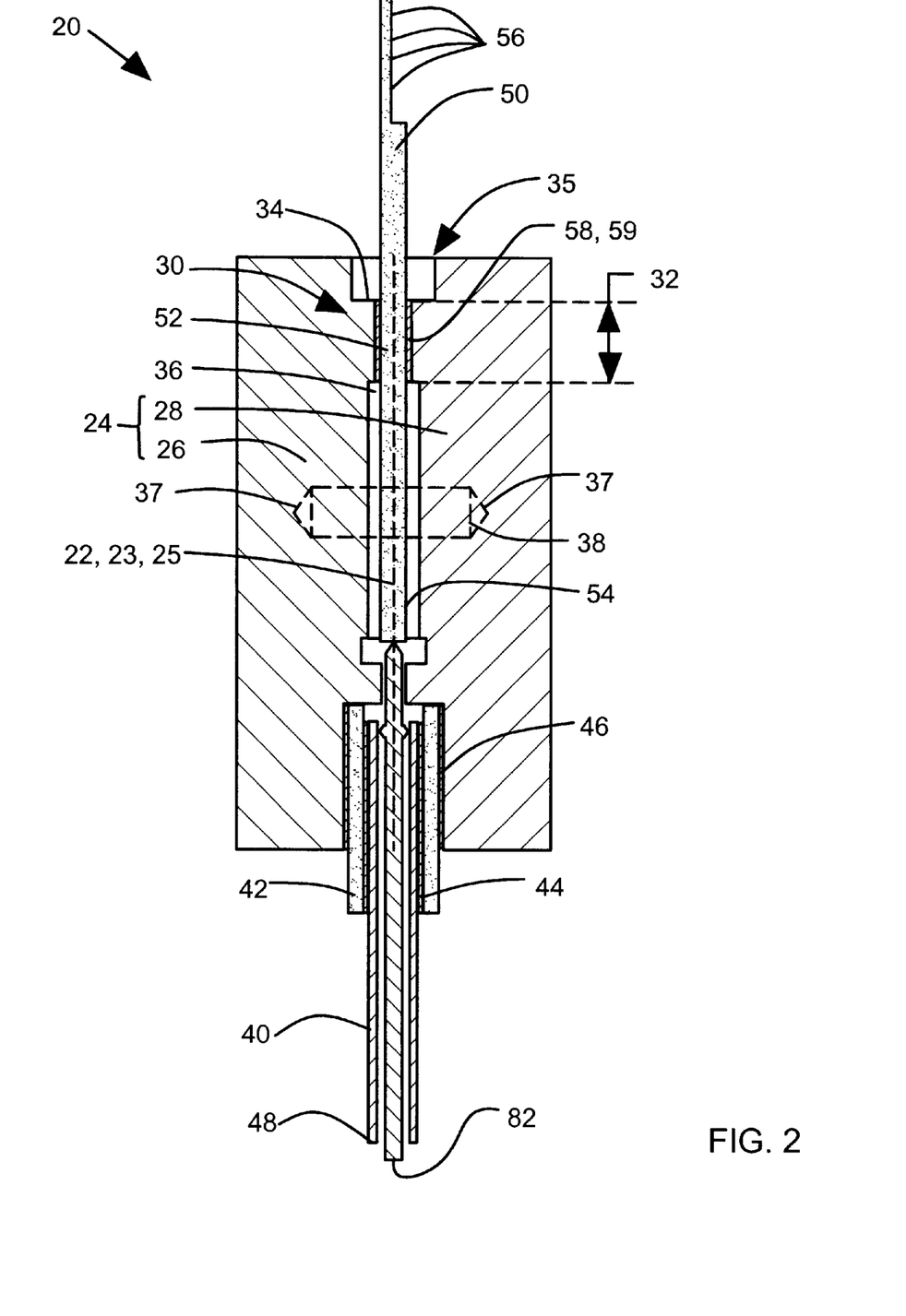
FIG. 2 illustrates a front sectional view of the sensor capsule shown in FIG. 1.
Figure 3:
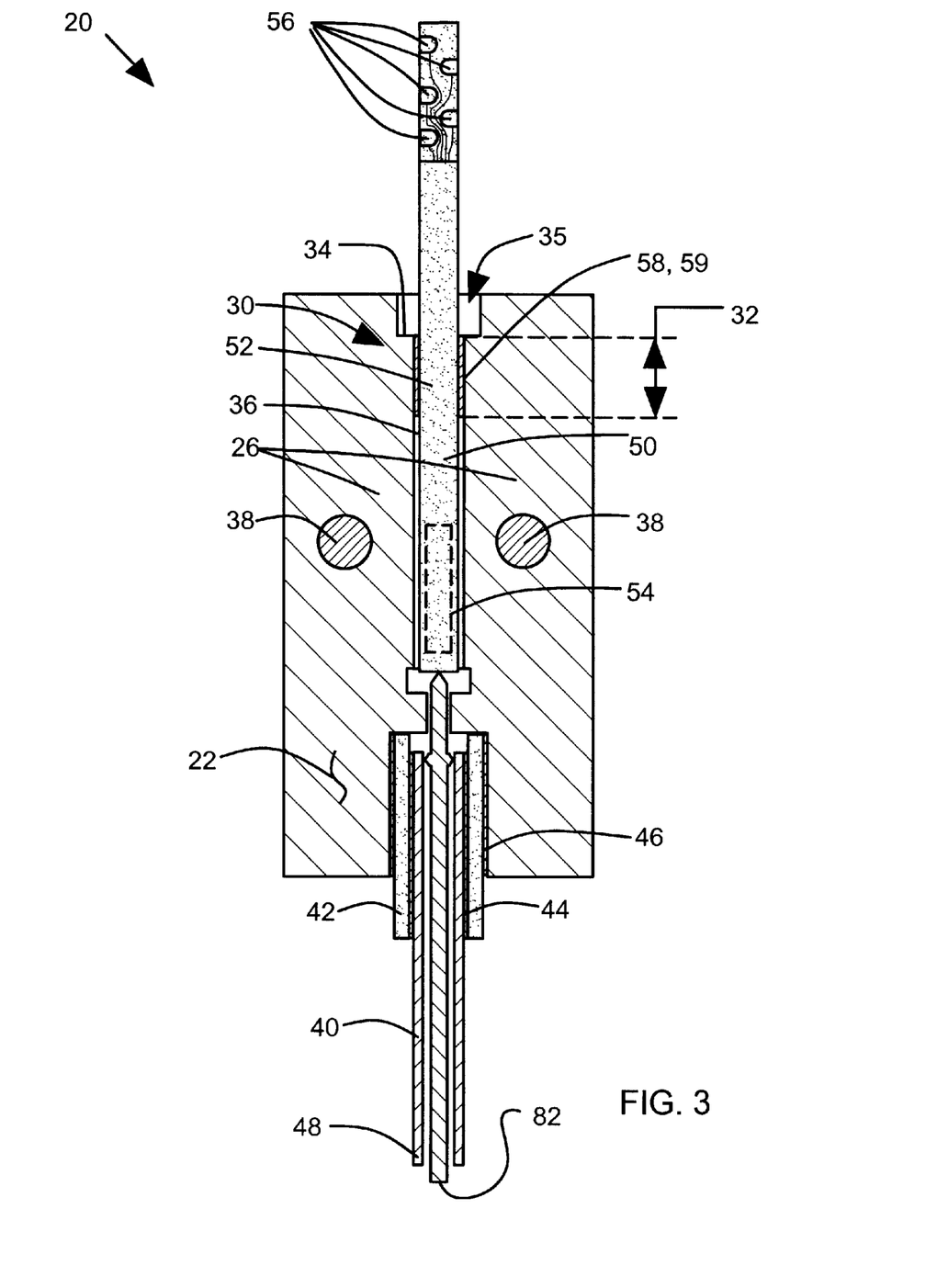
FIG. 3 illustrates a side sectional view of the sensor capsule shown in FIG. 1.

An exemplary sensor capsule 20 is illustrated in FIGS. 1–3. FIG. 1 illustrates an isometric view of sensor capsule 20. FIG. 2 illustrates a front sectional view of the sensor capsule 20. FIG. 3 illustrates a side sectional view of the sensor capsule 20. The view in FIG. 3 is generally along a joining surface 22 between block halves 26,28 of block 24.

As illustrated in FIGS. 1–3, the sensor capsule 20 comprises a block 24 that has a sensor mounting hole 30 with a sensor mounting hole length 32 extending from an outer block surface 34 to a pressure chamber 36 in the block 24. Outer block surface 34 is at the bottom of a well 35. Well 35 is explained in more detail below in connection with FIGS. 4–5.

Block 24 can be formed using any suitable material and shaping method, however, block 24 is formed as two block halves 26, 28 as illustrated and joined together at joining surfaces 22,23. Block halves 26, 28 can be formed by milling, by using powdered metal, injection powder metal or other known processes. In one preferred embodiment, block halves 26, 28 are formed of Nickel 200 and are joined by gold nickel brazing at approximately 980 degrees centigrade. As alternatives, block halves 26, 28 can be formed from Alloy 46, or silver copper brazing can be used to join block halves 26, 28.

In yet another preferred embodiment, block halves 26, 28 can be formed of ceramic. When block halves 26, 28 are ceramic, they can be joined to one another by reaction bonding or chemical bonding as shown, for example, in U.S. Pat. No. 4,050,956 de Bruin et al. Other know ceramic bonding processes can be used as well.

As a convenience in aligning block halves 26, 28 during joining, the block halves 26, 28 can be provided with alignment holes 37 and pins (or tubes) 38. Pins 38 extend between the block halves 26, 28 during brazing to ensure precise alignment of the block halves 26, 28, particularly around sensor mounting hole 30. In a preferred arrangement, the two alignment pins 38 are made of $\frac{1}{16}$ inch diameter by 0.100 inch long nickel tubing. The overall size of block 24 is preferably on the order of less than 25 mm (1 inch).

A fluid inlet tube 40 is brazed into block 24 at the same time that the block halves 26, 28 are brazed together. In a preferred arrangement, a ceramic tube 42 is interposed between the fluid inlet tube 40 and the block 24. Ceramic tube 42 is electrically insulating and provides electrical isolation between the fluid inlet tube 40 and the block 24. A braze joint 44 seals the fluid inlet tube to the ceramic tube 42, and a braze joint 46 seals the ceramic tube 42 to the block 24. The fluid inlet tube 40 is hollow and open to the pressure chamber 36 in block 24 to deliver fluid to the pressure chamber 36. Fluid inlet tube 40 has a distal end 48 that is connectable to a source of fluid. The fluid provided to distal end 48 passes through the fluid inlet tube 40 to pressure chamber 36 where it comes in contact with a wetted portion of a sensor 50. Typically, the fluid provided to distal end 48 is an isolator fluid, such as silicone oil, that communicates pressure to sensor 50, which is typically a pressure sensor.

The sensor 50 has a sensor neck 52 positioned in the sensor mounting hole 30. Sensor neck 52 is brazed to sensor mounting hole 30 by a sensor braze joint 58. Sensor braze joint 58 fills a braze cavity 59 between the sensor neck 52 and the sensor mounting hole 30. In some applications, sensor neck 52 may be metallized to facilitate brazing. Sensor braze joint 58 and braze cavity 59 are described in more detail below in connection with examples shown in FIGS. 4,5.

The sensor is elongated and has a fluid sensing surface 54 suspended in the pressure chamber 36. Fluid sensing surface 54 is spaced away from sensor neck 52. The spacing between fluid sensing surface 54 and sensor neck 52 provides mechanical stress isolation for the fluid sensing surface 54.

The sensor 50 has electrical sensor connections 56 that are accessible for connection outside the block 24. Typically, the electrical connections 56 are connected to a ribbon cable (not illustrated in FIGS. 1–3). Sensor 50 is typically an absolute pressure sensor with an external body formed of ceramic material. The external body preferably comprises alumina in the form of single crystal sapphire layers. Example of sensor construction are described in copending U.S. application Ser. No. 09/477,689 titled "Pressure sensor capsule with improved isolation" filed Jan. 6, 2000, and also in U.S. Pat. No. 6,089,097 Frick et al.

Figure 4:
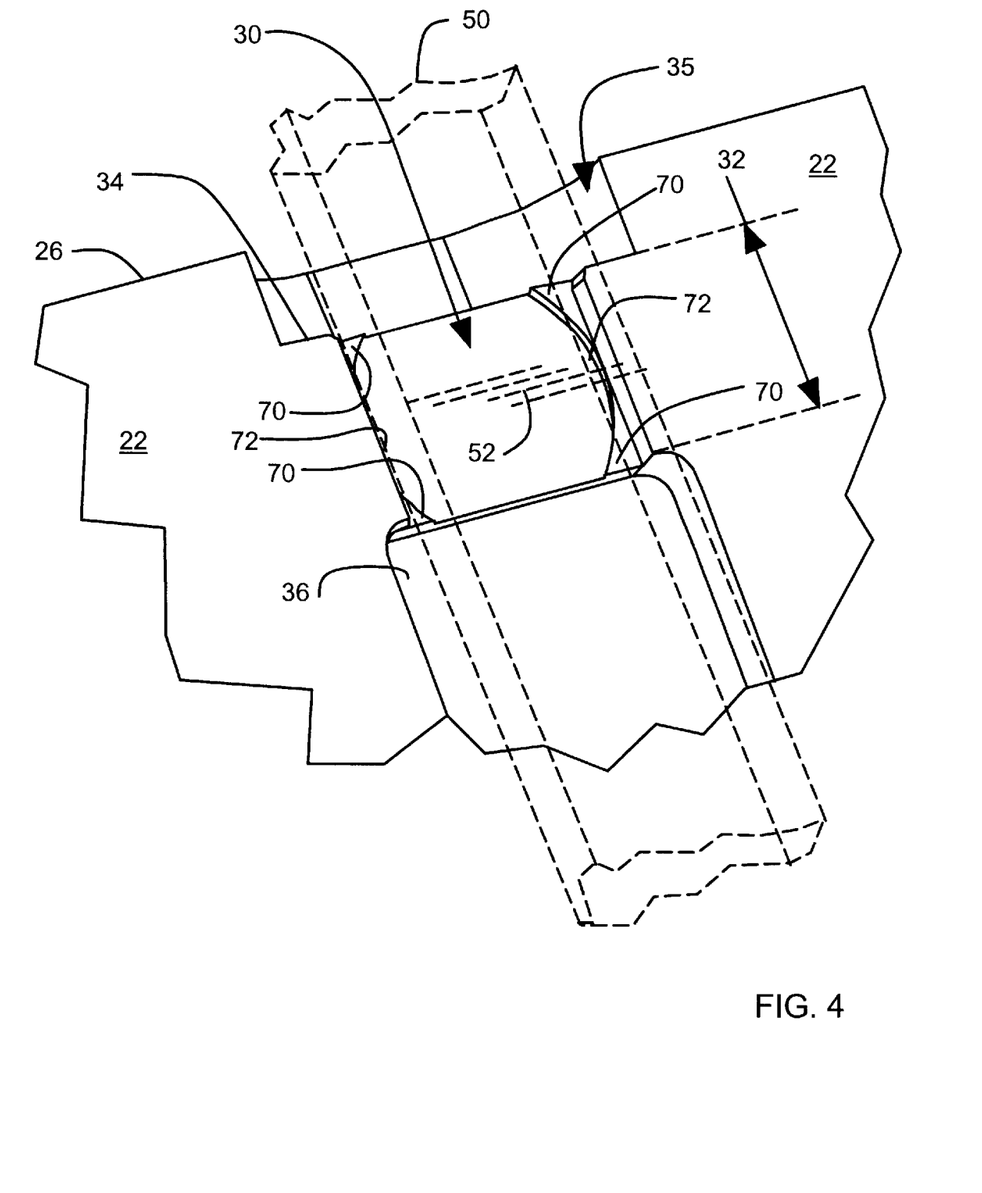
FIG. 4 illustrates an oblique partial view of an exemplary braze cavity in the sensor capsule shown in FIG. 1.

FIG. 4 illustrates an oblique partial view of an example of an upper end of block half 26 of FIG. 1. The features of the block half 26 illustrated in FIG. 4 are also included in block half 28. For clarity, sensor braze joint 58 is not illustrated in FIG. 4, but is shown separately in FIG. 5 below.

A plurality of fingers 70 are arranged around the sensor neck 52 inside the sensor mounting hole 30. Each finger 70 extends over less than the sensor mounting hole length 32, forming gaps 72 adjacent the fingers 70.

Figure 5:
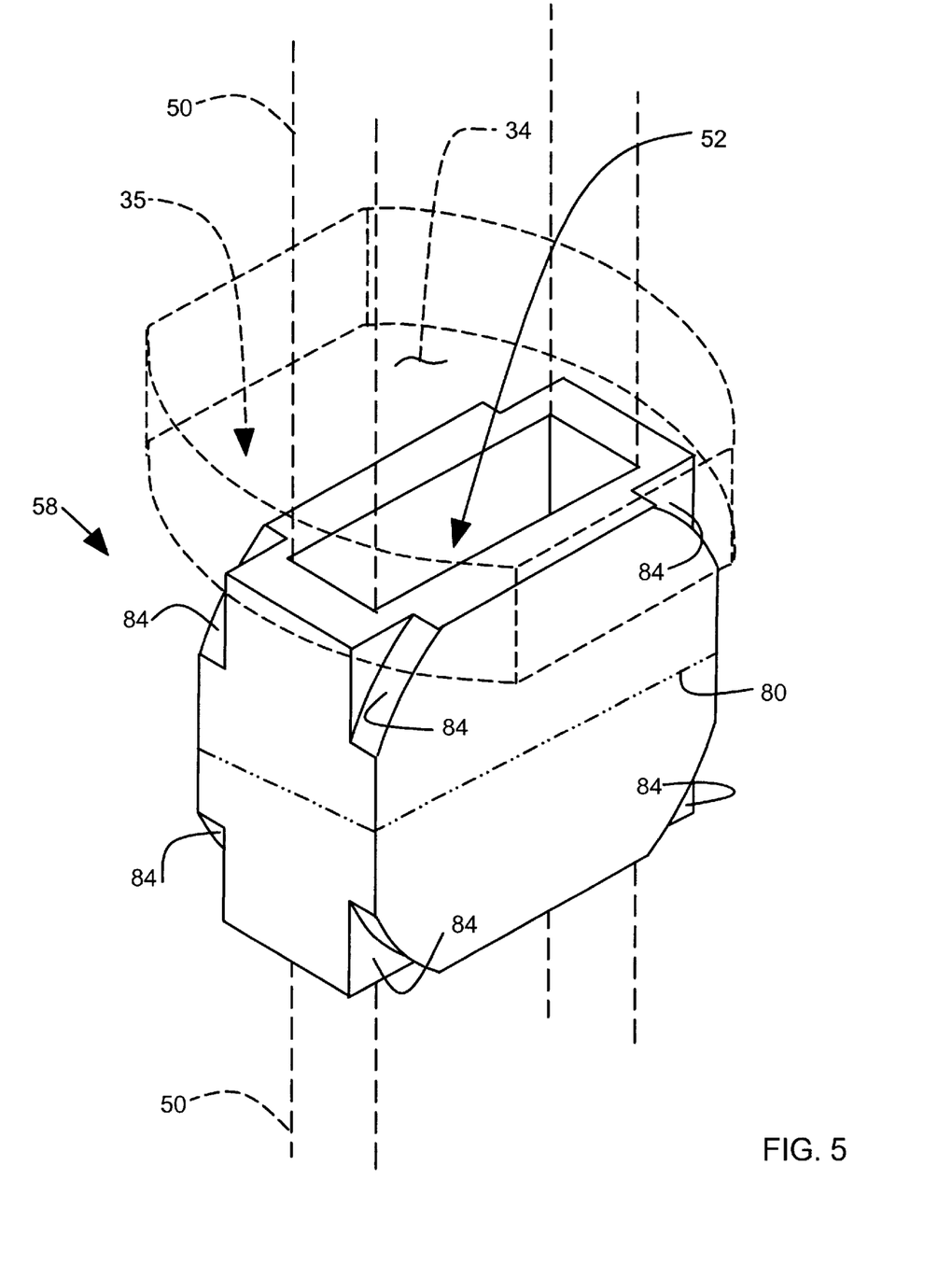
FIG. 5 illustrates an exemplary sensor braze joint formed in the braze cavity shown in FIG. 4.

FIG. 5 illustrates an example of a sensor braze joint 58 that can be formed in the sensor mounting hole 30 shown in FIG. 4. The sensor braze joint 58 fills the gaps 72 adjacent the fingers 70 and joins the sensor neck 52 to the sensor mounting hole 30. The sensor braze joint 58 has a wall with a thickness that is generally uniform around the circumference 80. The sensor braze joint 58, however, has notches 84 where the thickness of sensor braze joint 58 is reduced where the fingers 70 protrude into the generally uniform thickness. The sensor braze joint 58 extends completely around a circumference 80 of the sensor neck 52 adjacent the fingers. At the circumference 80 (in other words, in gaps 72 between the fingers 70), the sensor braze joint 58 has a uniform thickness in the range of 0.025 to 0.076 millimeters (0.001 to 0.003 inches). This thickness of sensor braze joint 58 around circumference 80 allows optimum spacing to maximize wicking and capillary action of the sensor braze joint while maintaining close alignment of the sensor sensor neck 52 in the sensor mounting hole 30. The sensor mounting hole 30 is generally rectangular and has eight (8) fingers 70 located in its corners as illustrated. The eight fingers 70 position the sensor in the middle of the sensor mounting hole 30 such that after brazing the sensor 50 is aligned. The alignment is made possible by using a pin 82 (see FIGS. 2–3) or other device to temporarily support the mass of the sensor 50, and relying on the fingers 70 and capillary action around the circumference 80 to center the sensor 50 in the sensor mounting hole 30. After brazing is complete, the pin 82 is removed.

The fingers 70 position the sensor 50 perpendicular to the length of sensor 50 to optimize the capillary action in sensor braze joint 58. A fixture (not illustrated) that includes the small pin 82 positions the sensor 50 at the correct height in relation to the block 24. The fixture also holds the block 24 in place such that the sensor 50 is positioned for brazing in sensor mounting hole 30.

The well 35 is arranged adjacent the sensor mounting hole 30. The well 35 provides a pocket to hold beads of braze material in position while the block and sensor are placed in a vacuum oven for heating. Sensor braze joint 58 is preferably a gold germanium braze which flows at about 450 degrees centigrade out of the well 35 into the sensor braze joint 58. The brazing temperature of the sensor braze joint 58 around the sensor neck 52 is much lower than the brazing temperature of the block braze joint 25 between joining surfaces 22,23 of block halves 26, 28. Sensor braze joint 58 can be completed without melting the block braze joint 25 between the block halves 26, 28. Other braze methods such as induction or a torch can also be used.

Figure 6:
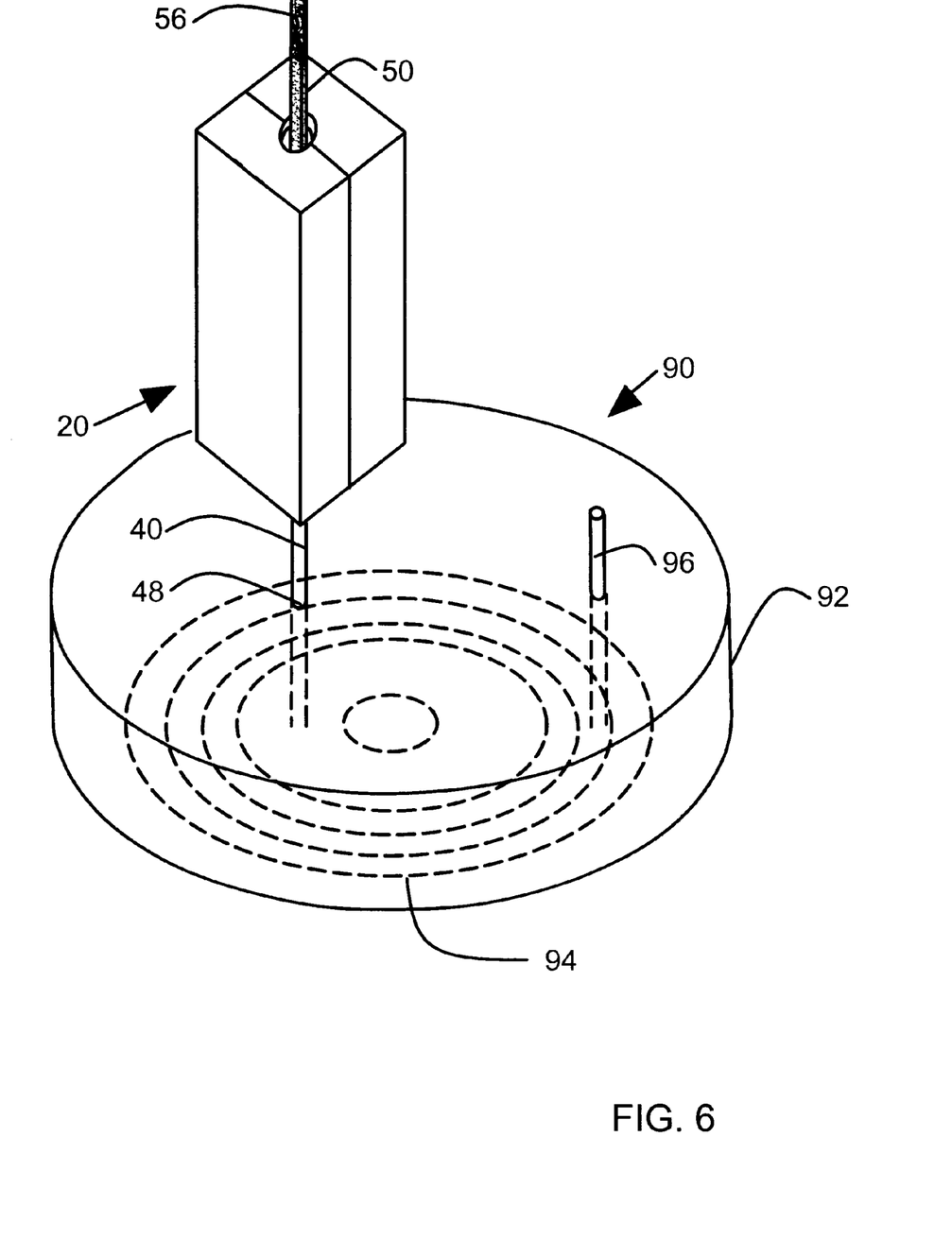
FIG. 6 illustrates a sensor capsule mounted to an isolator assembly.

FIG. 6 illustrates a sensor capsule such as the sensor capsule 20 shown in FIGS. 1–3 mounted to an isolator assembly 90. Isolator assembly 90 includes an isolator backing plate 92 with an isolator diaphragm 94 welded or brazed to a bottom face of the isolator plate 92. The tube 40 of sensor capsule 20 is welded or brazed to the backing plate 92. A fill tube 96 is also welded or brazed to the backing plate 92. After assembly of the sensor capsule 20 with the isolator assembly 90, a vacuum is drawn on the internal passageways and chambers in fill tube 96, isolator back plate 92 and sensor capsule 20. After a vacuum is drawn, the entire assembly is filled with isolator fluid such as silicone oil, and fill tube 96 is pinched off and welded shut. The arrangement in FIG. 6 is then installed in a pressure transmitter (not illustrated here) and a flexible printed circuit is connected to contacts 56 on sensor 50.

Figure 7:
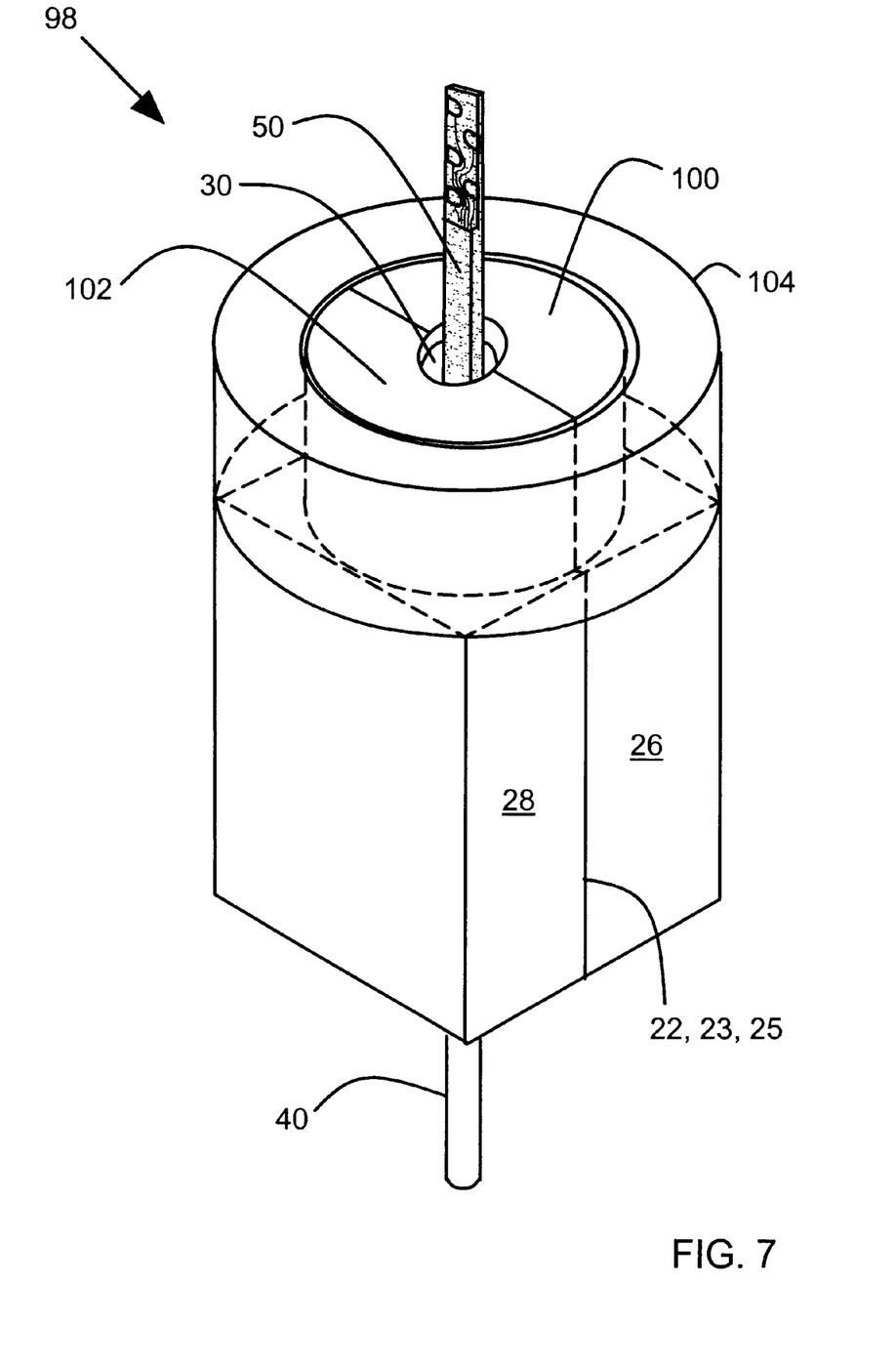
FIG. 7 illustrates an isometric view of a sensor capsule with a pressure ring.

FIG. 7 illustrates an isometric view of a sensor capsule 98 that is adapted to include a support ring 104 surrounding a sensor mounting hole 30. In sensor capsule 98, the block halves 26, 28 are each modified to have a semicylindrical portion 100, 102 that receives the support ring 104. The pressure integrity of the sensor capsule 98 is enhanced by the addition of support ring 104. Support ring 104 preferably comprises a stainless steel ring brazed on the semicylindrical portions 100, 102 on the block surrounding the sensor mounting hole 30.

Figure 8:
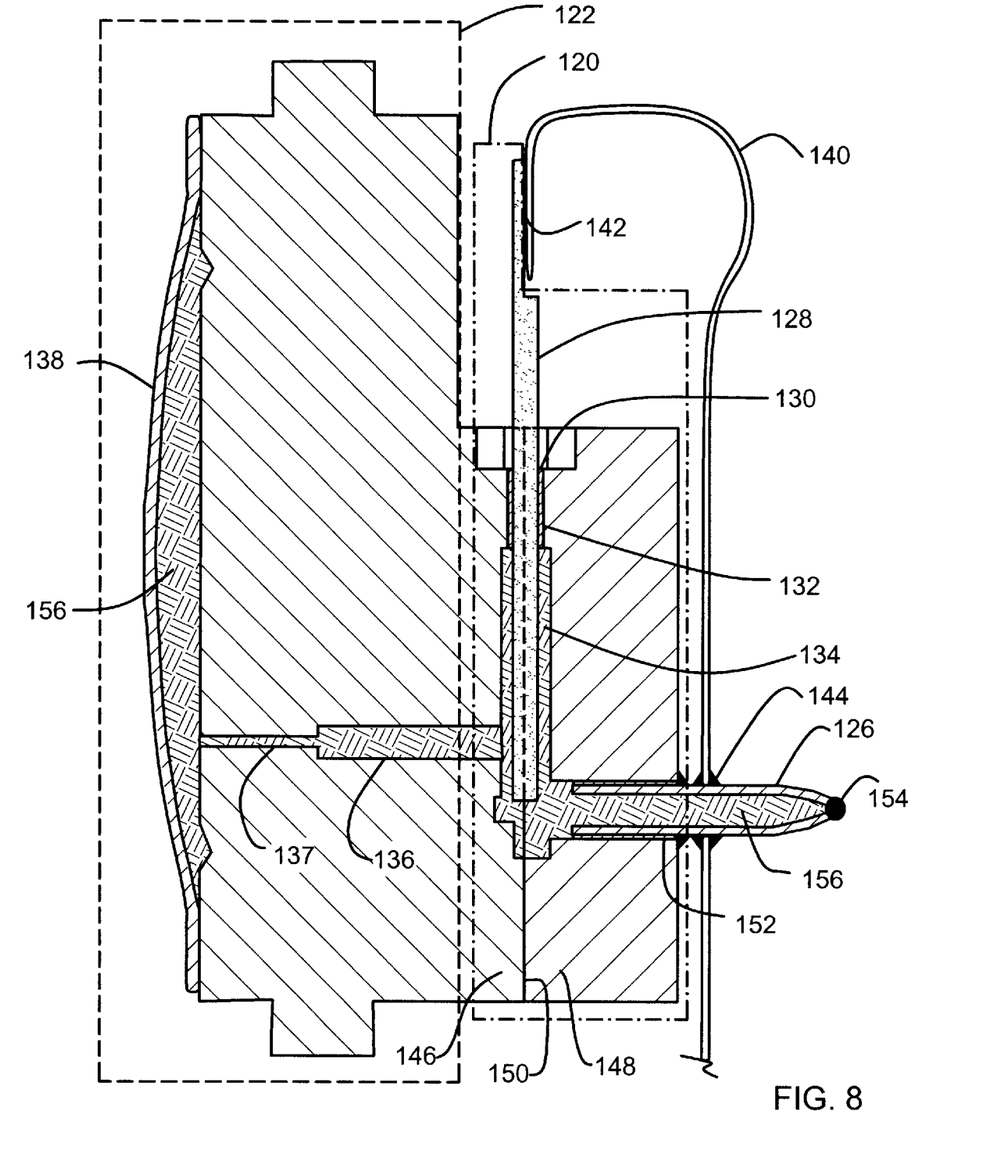
FIG. 8 illustrates a sensor capsule integrally formed with an isolator assembly.
Figure 9:
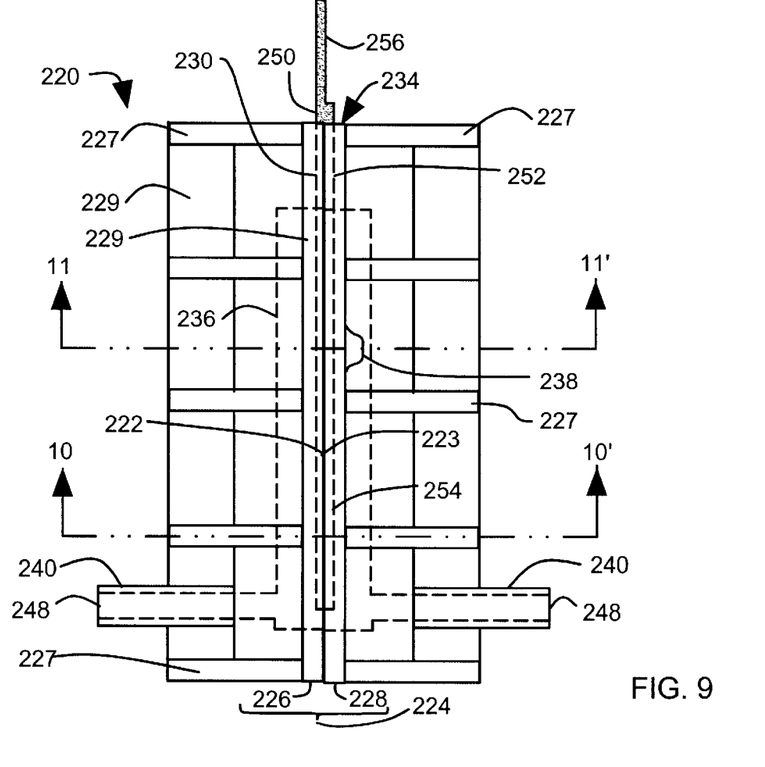
FIG. 9 illustrates a front elevational view of a molded block for a sensor capsule.
Figure 10:
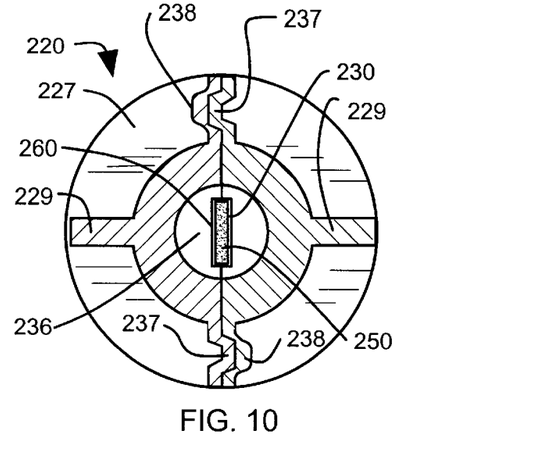
FIG. 10 illustrates a sectional view of the molded block of FIG. 9 along line 10–10'.
Figure 11:
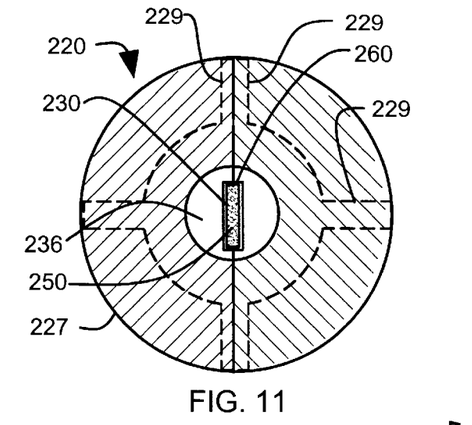
FIG. 11 illustrates a sectional view of the molded block of FIG. 9 along line 11–11'.

FIG. 8 illustrates a sensor capsule 120 integrally formed with an isolator assembly 122. The sensor capsule 120 is formed when half-blocks 146, 148 are brazed together along joining surfaces with a braze joint 150. Sensor mounting hole 130 can include optional fingers as explained above in connection with FIGS. 4–5. A sensor braze joint 132 in FIG. 8 is similar to the sensor braze joint 58 illustrated in FIG. 1–3. Pressure chamber 134 is connected via a fluid passageway 136 to the backside of an isolator diaphragm 138. Fluid passageway 136 includes a narrowed portion 137 that provides flameproofing between the isolator diaphragm 138 and the sensor chamber 134.

The isolator diaphragm 138 is attached to half-block 146. The fill tube 126 is brazed to half-block 148 by a braze joint 152. Then, the half-block 146 is brazed to the half-block 148 at braze joint 150. A pin similar to pin 82 in FIGS. 2–3 (not illustrated in FIG. 8) is temporarily inserted in fill tube 126 to support a sensor 128 while sensor 128 is brazed to sensor mounting hole 130 with sensor braze joint 132. Next, a vacuum is drawn, and then the cavities and passageways in sensor capsule 120 and isolator assembly 122 are filled with isolator fluid 156 such as silicone oil. Finally, the fill tube 126 is pinched off and welded shut with a weld 154 to seal a controlled amount of isolator fluid 156 in the complete assembly. When a pressure is applied to isolator diaphragm 138, the pressure is transferred to the sensor 134 by the isolator fluid 156.

A flexible printed circuit 140 is added to connect contacts 142 on sensor 128 to an electronic circuit (not illustrated). The flexible printed circuit 140 is supported by a solder connection 144 on fill tube 126.

Another embodiment of a sensor capsule 220 is illustrated in FIGS. 9–12. As illustrated in FIGS. 9–12, the sensor capsule 220 comprises a block 224 that has a generally rectangular sensor mounting hole 230 with a sensor mounting hole length 232 (FIG. 12) extending from an outer block surface 234 to a pressure chamber 236 in the block 224. Outer block surface 234 is located at the bottom of a well 235. Well 235 is explained in more detail below in connection with FIG. 12.

Block 224 can be formed using any suitable molding technology, however, block 224 is formed as two block halves 226, 228 as illustrated and joined together at joining surfaces 222, 223. Block halves 226, 228 can be formed by injection molding or other known molding processes. In one preferred embodiment, block halves 226, 228 are formed of plastic and are joined by solvent bonding or adhesive. Block halves 226, 228 are preferably identical mating parts. Especially when they are formed of plastic, block halves 226, 228 include radial support disc halves 227 and longitudinal support rails 229. Disc halves 227 and support rails 229 provide structural support to help contain pressure in the pressure chamber 236.

As a convenience in aligning block halves 226, 228 during joining, the block halves 226, 228 are preferably provided with convex alignment dimples 237 and concave alignment dimples 238. Dimples 237 nest in dimples 238 during joining of block halves 226, 228 to ensure precise alignment during joining of the block halves 226, 228, particularly around sensor mounting hole 230. In a preferred arrangement, the two dimples 237, 238 are about 1/16 inch diameter and are integrally formed with block halves 226, 228 in the injection molding process. The overall size of block 224 is preferably on the order of less than 25 mm (1 inch).

Fluid inlet tubes 240 are integrally formed into block halves 226, 228 during the injection molding process. Fluid inlet tubes 240 are electrically insulating and provides electrical isolation for a sensor 250 from connecting tubes (not illustrated). The fluid inlet tubes 240 are hollow and open to the pressure chamber 236 in block 224 to deliver fluid to the pressure chamber 236. Fluid inlet tubes 240 each has a distal end 248 that is connectable to a source of fluid. If desired, fluid can be arranged to flow through the sensor capsule 220, or one of the fluid inlet tubes can alternatively be plugged. The fluid provided to distal end 248 passes through the fluid inlet tube 240 to pressure chamber 236 where it comes in contact with a wetted portion of the sensor 250. Typically, the fluid provided to distal end 248 is an isolator fluid, such as silicone oil, that communicates pressure to sensor 250, which is typically a pressure sensor.

Figure 12:
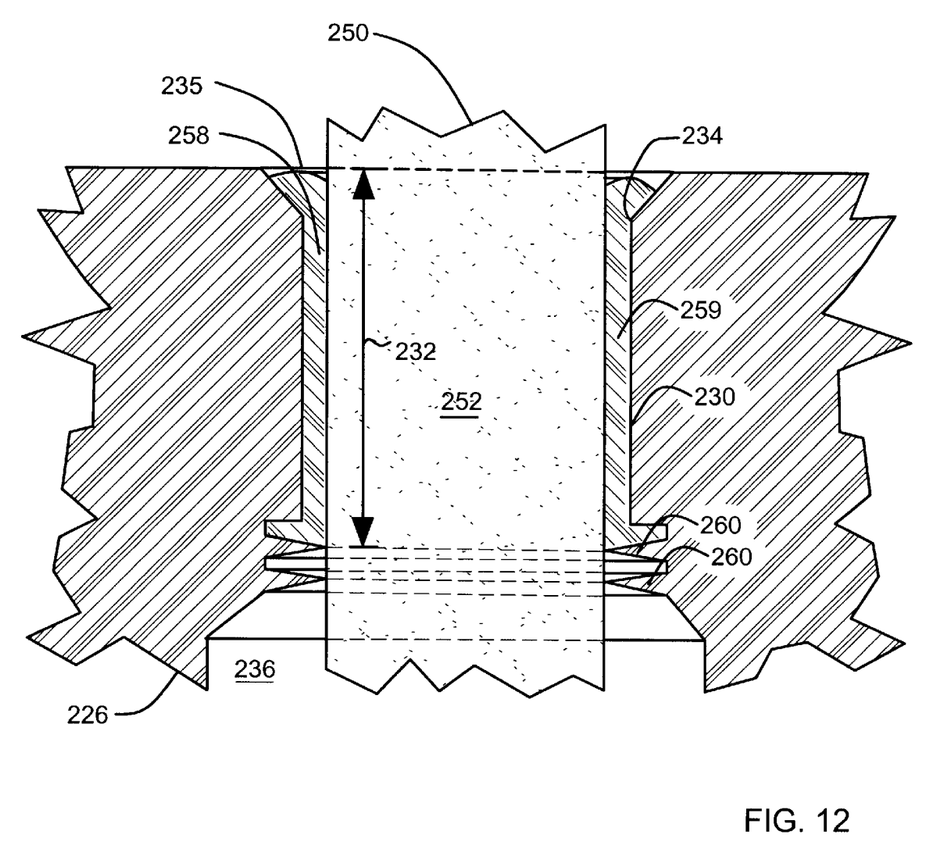
FIG. 12 illustrates a front sectional detail of mounting of a sensor in the molded block of FIG. 9.

The sensor 250 has a sensor neck 252 positioned in the sensor mounting hole 230. Sensor neck 252 is joined to sensor mounting hole 230 by a sealing compound 258. Sealing compound 258 fills a seal cavity 259 between the sensor neck 252 and the sensor mounting hole 230. In some applications, sensor neck 252 or sensor mounting hole 230 may be primed or etched to facilitate bonding. Sealing compound 258 can be applied as a liquid using a hypodermic needle and then allowed to set up or solidify. The well 235 allows for visual inspection of the completion of filling of sealing cavity 259 with sealing compound 258. Sealing compounds such as RTVs (room temperature vulcanizing rubbers) or epoxies can be used, depending on the needs of the application. The seal cavity 259 is long and narrow to resist movement of the sensor 250 when the pressure chamber 236 is pressurized. The bottom of seal cavity 256 is provided with one or more ridges or fingers 260 that surround the sensor neck 252. The ridges or fingers 260 are thin and tapered as illustrated and deform when sensor 250 is pressed in place to form a temporary seal at the bottom of the seal cavity 256. The seal formed by ridges or fingers 260 minimizes leakage of sealing compound 258 while the sealing compound 258 is solidifying.

The sensor 250 is elongated and has a fluid sensing surface 254 suspended in the pressure chamber 236. Fluid sensing surface 254 is spaced away from sensor neck 252. The spacing between fluid sensing surface 54 and sensor neck 252 provides mechanical stress isolation for the fluid sensing surface 254.

The sensor 250 has electrical sensor connections 256 that are accessible for connection outside the block 224. Typically, the electrical connections 256 are connected to a ribbon cable (not illustrated in FIGS. 9–12). Sensor 250 is typically an absolute pressure sensor with an external body formed of ceramic material. The external body preferably comprises alumina in the form of single crystal sapphire layers. Example of sensor construction are described in copending U.S. application Ser. No. 09/477,689 titled "Pressure sensor capsule with improved isolation" filed Jan. 6, 2000, and also in U.S. Pat. No. 6,089,097 Frick et al.

Although the present invention has been described with reference to preferred embodiments, workers skilled in the art will recognize that changes may be made in form and detail without departing from the spirit and scope of the invention.

What is claimed is:

1. A sensor capsule, comprising:
   a block that has a sensor mounting hole with a sensor mounting hole length extending from a first outer block surface into a pressure chamber in the block; the block further having a fluid inlet hole extending from a second outer block surface into the pressure chamber; the block comprising two half-blocks joined along mating surfaces passing lengthwise through the sensor mounting hole;
   a sensor that has a sensor neck passing through and being surrounded by the sensor mounting hole, a fluid sensing surface suspended in the pressure chamber and electrical sensor connections outside the pressure chamber; the sensor neck being separated from the sensor mounting hole by a gap that extends in a continuous path around the sensor neck; and
   a sensor braze joint that fills the gap to join the sensor neck to the sensor mounting hole.

2. The sensor capsule of claim 1 wherein the sensor braze joint comprises gold and germanium.

3. The sensor capsule of claim 1 wherein the sensor braze joint in the gap has a thickness in the range of 0.025 to 0.076 millimeters (0.001 to 0.003 inches).

4. The sensor capsule of claim 1 wherein the first outer block surface comprises a well shape, the well shape having a volume at least equal to a volume of the sensor braze joint.

5. The sensor capsule of claim 1 further comprising a plurality of fingers that are arranged in the sensor mounting hole to support the sensor neck, each finger extending over less than the sensor mounting hole length.

6. The sensor capsule of claim 1 further comprising a block braze joint joining the mating surfaces of the half blocks.

7. The sensor capsule of claim 6 wherein the sensor braze joint has a melting temperature that is lower than a melting temperature of the block braze joint.

8. The sensor capsule of claim 1 wherein the sensor neck comprises a ceramic material.

9. The sensor capsule of claim 8 wherein the ceramic material comprises alumina.

10. The sensor capsule of claim 9 wherein the alumina comprises single crystal sapphire layers.

11. The sensor capsule of claim 9 wherein the alumina is metallized.

12. The sensor capsule of claim 9 wherein the block comprises Alloy 46.

13. The sensor capsule of claim 9 wherein the block comprises Nickel 200 alloy.

14. The sensor capsule of claim 1 and further comprising a support ring mounted on block surrounding the sensor mounting hole.

15. The sensor capsule of claim 1 and further comprising a tube sealed in the fluid inlet hole and adapted to deliver fluid to the pressure chamber.

16. The sensor capsule of claim 15 and further comprising an isolator diaphragm assembly coupled to the tube.

17. The sensor capsule of claim 1 further comprising an isolator diaphragm mounted to the second outer block surface over the fluid inlet hole.

18. The sensor capsule of claim 1 further comprising a flexible circuit electrically connected the electrical sensor connections and mechanically supported on the block.

19. A sensor capsule, comprising:
   a block that has a sensor mounting hole with a sensor mounting hole length extending from a first outer block surface into a pressure chamber in the block; the block further having a fluid inlet hole extending from a second outer block surface into the pressure chamber; the block comprising two half-blocks joined along mating surfaces passing lengthwise through the sensor mounting hole;

a sensor that has a sensor neck passing through and being surrounded by the sensor mounting hole, a fluid sensing surface suspended in the pressure chamber and electrical sensor connections outside the pressure chamber;

the sensor neck being separated from the sensor mounting hole by a gap that extends in a continuous path around the sensor neck; and a sealing compound that fills the gap to join the sensor neck to the sensor mounting hole.

20. The sensor capsule of claim 19 wherein the half-blocks are plastic half blocks.

* * * * *

UNITED STATES PATENT AND TRADEMARK OFFICE
CERTIFICATE OF CORRECTION

PATENT NO. : 6,561,038 B2 Page 1 of 1
DATED : May 13, 2003
INVENTOR(S) : Gravel et al.

It is certified that error appears in the above-identified patent and that said Letters Patent is hereby corrected as shown below:

Title page,
Item [56], Reference Cited, U.S. PATENT DOCUMENTS, insert:
-- 09/477,689    01/06/00    Sittler
   09/478,383    01/06/00    Lutz et al.
   09/478,434    01/06/00    Frick et al.
   09/603,640    01/06/00    Sittler et al.
   09/755,346    01/05/01    Romo et al. --

Column 8,
Line 62, after "connected" insert -- to --

Signed and Sealed this

Twenty-fifth Day of May, 2004

JON W. DUDAS
*Acting Director of the United States Patent and Trademark Office*